United States Patent
Klaus et al.

(10) Patent No.: US 11,515,753 B2
(45) Date of Patent: Nov. 29, 2022

(54) REDUCTION GEARBOX

(71) Applicant: Rolls-Royce Deutschland Ltd & Co KG, Blankenfelde-Mahlow (DE)

(72) Inventors: Christoph Klaus, Teltow (DE); Konstantinos Emmanouil, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 495 days.

(21) Appl. No.: 16/575,946

(22) Filed: Sep. 19, 2019

(65) Prior Publication Data

US 2020/0106336 A1    Apr. 2, 2020

(30) Foreign Application Priority Data

Oct. 1, 2018 (DE) .................... 10 2018 124 206.9

(51) Int. Cl.
*H02K 7/116* (2006.01)
*F02C 7/36* (2006.01)
*F16H 57/02* (2012.01)

(52) U.S. Cl.
CPC ............. *H02K 7/116* (2013.01); *F02C 7/36* (2013.01); *F05D 2220/76* (2013.01); *F05D 2260/40311* (2013.01); *F16H 2057/02034* (2013.01); *F16H 2057/02073* (2013.01)

(58) Field of Classification Search
CPC ...... H02K 7/116; H02K 1/2713; H02K 1/278; H02K 7/1823; F02C 7/36; F05D 2220/76; F05D 2260/40311; F05D 2260/4031; F16H 2057/02034; F16H 2057/02073; F16H 1/32; F01D 15/10; Y02T 50/60; F02K 3/06

USPC ............................................................ 310/83
See application file for complete search history.

(56) References Cited

U.S. PATENT DOCUMENTS

| | | | |
|---|---|---|---|
| 4,785,688 A * | 11/1988 | Shiozaki | B65H 5/062 |
| | | | 475/149 |
| 4,827,712 A | 5/1989 | Coplin | |
| 6,239,520 B1 * | 5/2001 | Stahl | H02K 9/06 |
| | | | 310/216.119 |
| 8,324,775 B2 * | 12/2012 | Chen | H02K 7/116 |
| | | | 310/83 |

(Continued)

FOREIGN PATENT DOCUMENTS

GB    2550397 A    11/2017

OTHER PUBLICATIONS

"Permanent Magnet Maximum Working Temperature", advancedmagnets.com, printed on May 26, 2022.*

(Continued)

*Primary Examiner* — John K Kim
(74) *Attorney, Agent, or Firm* — Shuttleworth & Ingersoll, PLC; Timothy J. Klima

(57) ABSTRACT

A reduction gearbox which has: an input, which can be coupled to an input shaft, which has an input speed; an output, which rotates at an output speed that is lower than the input speed; and at least one statically arranged component. It is envisaged that an electric generator is integrated into the reduction gearbox, said generator comprising a rotor and a stator, wherein the rotor of the electric generator is coupled to the output of the reduction gearbox, and the stator of the electric generator is coupled to a statically arranged component of the reduction gearbox.

19 Claims, 6 Drawing Sheets

(56) References Cited

U.S. PATENT DOCUMENTS

| | | | |
|---|---|---|---|
| 2001/0012808 A1* | 8/2001 | Tajima | F16H 57/10 |
| | | | 475/331 |
| 2004/0070211 A1 | 4/2004 | Franchet et al. | |
| 2004/0255590 A1* | 12/2004 | Rago | F02C 7/36 |
| | | | 60/793 |
| 2009/0224625 A1* | 9/2009 | Hino | H02K 21/24 |
| | | | 310/209 |
| 2010/0120574 A1* | 5/2010 | Maekawa | F16H 1/46 |
| | | | 475/331 |
| 2011/0148237 A1* | 6/2011 | Toot | H02K 16/02 |
| | | | 310/114 |
| 2011/0273064 A1* | 11/2011 | Vuolle-Apiala | F03D 15/00 |
| | | | 310/75 R |
| 2012/0013211 A1* | 1/2012 | Chamberlin | H02K 7/116 |
| | | | 310/83 |
| 2012/0143422 A1* | 6/2012 | Kitahata | B60K 6/445 |
| | | | 475/5 |
| 2013/0292941 A1* | 11/2013 | Mountain | H02K 7/1823 |
| | | | 310/46 |
| 2016/0258324 A1* | 9/2016 | Cigal | F01D 21/00 |
| 2017/0175874 A1 | 6/2017 | Schwarz et al. | |
| 2019/0186616 A1* | 6/2019 | Bassis | F16H 57/028 |
| 2019/0338835 A1* | 11/2019 | Lindstrom | F16H 3/006 |
| 2019/0390596 A1* | 12/2019 | Goleczka | H02K 7/116 |
| 2020/0106336 A1* | 4/2020 | Klaus | H02K 7/1823 |

OTHER PUBLICATIONS

German Search Report dated Jul. 26, 2019 for counterpart German Patent Application No. 10 2018 124 206.9.

German Office Action dated Nov. 17, 2021 from counterpart German Patent Application No. 10 2018 124 206.9.

* cited by examiner

REDUCTION GEARBOX

This application claims priority to German Patent Application DE10208124206.9 filed Oct. 1, 2018, the entirety of which is incorporated by reference herein.

DESCRIPTION

The invention relates to a reduction gearbox according to the present disclosure and to a gas turbine engine having a reduction gearbox of this kind.

There is a known practice of coupling the fan of a gas turbine engine to a turbine shaft by means of a reduction gearbox. A reduction gearbox of this kind is designed as a planetary gearbox, for example, wherein the gearbox receives an input from the turbine shaft and outputs drive for the fan so as to drive the fan at a lower speed than the turbine shaft. The planetary gearbox comprises planet gears, which are driven by a sun gear and which revolve in a ring gear. Arranged in each of the planet gears is a planet pin, which is fixed in carrier plates of a planet carrier. The planet carrier is coupled to a drive for the fan.

In general, the aim should be to form and arrange the numerous complex components of a gas turbine engine in an effective manner.

It is the underlying object of the present invention to provide a reduction gearbox which is constructed in an effective way while being suitable for use in a gas turbine engine.

This object is achieved by a reduction gearbox having features as disclosed herein. Design embodiments are also disclosed herein.

Accordingly, the present invention concerns a reduction gearbox which has an input that is coupled to an input shaft which has an input speed, and has an output that rotates with an output speed. Here, the output speed is lower than the input speed. Moreover, the reduction gearbox comprises at least one statically arranged component, which is therefore arranged in a nonrotating manner.

According to the invention, an electric generator is integrated into the reduction gearbox. By its very nature, and electric generator comprises a rotor and a stator. It is envisaged that the rotor of the electric generator is coupled to the output of the reduction gearbox, and the stator of the electric generator is coupled to a statically arranged component of the reduction gearbox. Here, the statement that the rotor of the electric generator is coupled to the output of the reduction gearbox means that the rotor rotates at the same speed of rotation as the output of the reduction gearbox. For this purpose, the rotor is connected directly or via one or more further components to a component of the output for conjoint rotation therewith.

In this context, the input of the reduction gearbox is taken to mean a gearbox element which is coupled to the input shaft and rotates at the input speed. The output of the reduction gearbox is taken to mean a gearbox element which forms to the output and rotates at the output speed.

Thus, the invention is based on the idea of providing a reduction gearbox with an additional functionality such that the reduction gearbox additionally acts as an electric generator and, for this purpose, incorporates the rotating and static components of an electric generator. Here, the rotor of the electric generator is connected or coupled to the output of the reduction gearbox and rotates at the output speed.

In this context, and electric generator refers to any device which converts kinetic energy into electric energy by means of electromagnetic induction. The present invention is fundamentally suitable for any type and design of electric generator that has a rotor and a stator.

One embodiment of the invention envisages that the output of the reduction gearbox and the rotor, on the one hand, and the statically arranged component and the stator, on the other hand, are arranged and positioned relative to one another in such a way that the rotor and the stator are spaced apart axially. Thus, this represents an unusual construction since rotors and stators of an electric motor are typically spaced apart radially. Spacing the rotor and the stator apart axially is associated with the advantage that a small installation space is required in comparison with radial spacing.

However, it is likewise possible—and this represents another embodiment of the invention—the output of the reduction gearbox and the rotor, on the one hand, and the statically arranged component and the stator, on the other hand, are arranged and positioned relative to one another in such a way that the rotor and the stator are spaced apart radially. In this case, it is further envisaged that the stator is arranged radially on the outside with respect to the rotor, i.e. the rotor rotates within the stator.

According to one embodiment of the invention, it is envisaged that the rotor of the electric generator has a plurality of magnets and the stator of the electric generator has a plurality of induction coils. In this case, the rotor is of annular design, for example. A variant embodiment here envisages that the magnets are formed by permanent magnets, which are connected to the rotating output of the reduction gear unit. This provides a simple embodiment and avoids the necessity of a power supply to the magnets.

In principle, it is likewise possible for the induction coils to be formed in the rotor and the magnets to be formed in the stator. In this case, power is taken off at the rotor.

Another embodiment envisages that the rotor of the electric generator is shielded from the adjoining component of the reduction gearbox by means of a magnetic shielding element. The magnetic shielding element is formed by a ceramic plate, for example. Magnetization of the power-transmitting components of the reduction gearbox is thereby prevented. Such magnetization should be prevented since it carries the inherent risk that ferromagnetic particles will collect on the surface of the power-transmitting components and increase the wear thereof.

One embodiment of the invention envisages that the statically arranged component of the reduction gearbox, to which the stator is connected, is formed by a statically arranged wall structure which at least partially surrounds the reduction gearbox radially on the outside. A wall structure of this kind is the casing or a casing section of the reduction gearbox, for example. In this case, the stator of the electric generator is arranged on the inner wall of the casing of the reduction gearbox. This allows great freedom of design in respect of the exact arrangement of the stator.

In alternative embodiments, it is envisaged that the statically arranged component of the reduction gearbox, to which the stator is coupled, is formed by a statically arranged gearbox element of the reduction gearbox. Such a statically arranged gearbox element is the ring gear of a reduction gearbox designed as a planetary gearbox, for example.

Another embodiment of the invention envisages that the reduction gearbox is designed as a planetary gearbox. Accordingly, it has a sun gear which rotates around an axis of rotation of the planetary gearbox and is driven by a sun shaft. Here, the sun gear forms the input of the planetary gearbox. The planetary gearbox furthermore has a plurality of planet gears, which are driven by the sun gear, and a ring gear, with which the plurality of planet gears is in engagement. Furthermore, a planet carrier, which couples the planet gears to one another, and a statically arranged planetary gearbox casing, which surrounds the planetary gearbox radially on the outside, are provided.

Two variant embodiments are possible here. According to one variant embodiment, the planet gears revolve synchronously around the sun gear and the ring gear is arranged in a static manner. In this case, the planet carrier or a structure coupled to the latter forms the output of the planetary gearbox. According to the other variant embodiment, the planet carrier is of static design and the ring gear revolves around the sun gear. In this case, the ring gear or a structure coupled to the latter forms the output of the planetary gearbox.

In this context, one variant embodiment envisages that the statically arranged component to which the stator of the electric generator is coupled is the planetary gearbox casing.

In one embodiment, the planetary gearboxes designed in such a way that the planet gears move (orbit) synchronously around the sun gear and the ring gear is arranged in a static manner. A plurality of planet pins is provided, wherein each planet pin is arranged in a planet gear. The planet carrier has an axially forward carrier plate and an axially rearward carrier plate, wherein the planet pins are arranged in openings in the axially forward carrier plate and in the axially rearward carrier plate and are connected to the carrier plates. In this arrangement, the rotor of the electric generator is connected to the axially rearward carrier plate.

In this case, the stator of the electric generator can be fixed on the planetary gearbox casing in a manner spaced apart axially from the rotor or spaced apart radially from the rotor.

The arrangement of the rotor of the electric generator on a carrier plate of the planetary gearbox and the arrangement of the stator of the electric generator on the casing of the planetary gearbox provide a particularly compact and, at the same time, simple embodiment of the invention. The embodiment is simple and as much as no additional components of the planetary gearbox need to be provided to implement the electric generator. The rotor and the stator of the electric generator can be arranged on already existing components of the planetary gearbox.

It should be noted that the rotor does not have to be connected directly to the axially rearward carrier plate. The connection can be made via one or more holding elements, e.g. a holding plate, which is attached at one end to the carrier plate and holds the rotor or the permanent magnets.

Another embodiment envisages that the magnetic shielding element already mentioned is arranged between the axially rearward carrier plate and the rotor, wherein the rotor is spaced apart axially from the carrier plate, wherein the shielding elements is, for example, a ring or a plate which extends in the radial direction and the thickness of which corresponds to the axial spacing between the axially rearward carrier plate and the rotor or the permanent magnets of the rotor.

The rotor has n magnets, where n≥2, which are arranged at equidistant intervals along the circumference of the axially rearward carrier plate, wherein the corresponding for a different number of induction coils is likewise arranged at equidistant intervals on the planetary gearbox casing.

In a further aspect of the invention, the invention relates to a gas turbine engine for an aircraft, which has an engine core, a fan and a reduction gearbox according to the invention. Integrating the electric generator into the reduction gearbox makes it possible to dispense with a separate electric generator. This increases the degree of integration within the gas turbine engine and saves weight. It is also possible for the engine nacelle to be of slimmer design since it is no longer necessary to arrange a separate electric generator on the auxiliary equipment carrier, as is customary in the prior art.

One embodiment of the gas turbine engine envisages that permanent magnets, the magnetic properties of which are present up to a temperature of at least 150° C., are used for the rotor. By way of example, it is possible to use samarium-cobalt magnets (SmCo magnets), which have a high magnetic energy density and can also be used at high application temperatures. The advantage of using such permanent magnets is that they do not have to be cooled by virtue of their temperature properties. Thus, the temperature in the gearbox chamber of the reduction gearbox is typically in a maximum range of between 110° C. and 130° C. The stator connected to the gearbox casing can be cooled by means of the cooling system of the gearbox casing.

Another embodiment of the gas turbine engine envisages that the turbine, the compressor is a first compressor, and the turbine shaft is a first turbine shaft; that the engine core furthermore comprises a second turbine, a second compressor and a second turbine shaft, which connects the second turbine to the second compressor; and that the second turbine, the second compressor and the second turbine shaft are arranged in such a way as to rotate at a higher speed than the first turbine shaft.

It is pointed out that the present invention is described with reference to a cylindrical coordinate system which has the coordinates x, r, and φ. Here, x indicates the axial direction, r the radial direction and φ the angle in the circumferential direction. Starting from the x axis, the radial direction points radially outwards. Terms such as "in front of", "behind", "front", and "rear" refer to the axial direction, or the flow direction in the engine. Terms such as "outer" or "inner" refer to the radial direction.

As noted elsewhere herein, the present disclosure may relate to a gas turbine engine. Such a gas turbine engine may comprise an engine core which comprises a turbine, a combustion chamber, a compressor, and a core shaft that connects the turbine to the compressor. Such a gas turbine engine may comprise a fan (having fan blades) which is positioned upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive for the fan so as to drive the fan at a lower rotational speed than the core shaft. The input to the gearbox may be performed directly from the core shaft or indirectly from the core shaft, for example via a spur shaft and/or a spur gear. The core shaft may be rigidly connected to the turbine and the compressor, such that the turbine and the compressor rotate at the same rotational speed (wherein the fan rotates at a lower rotational speed).

The gas turbine engine as described and/or claimed herein may have any suitable general architecture. For example, the gas turbine engine may have any desired number of shafts, for example one, two or three shafts, that connect turbines and compressors. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft which connects the second turbine to the second compressor. The second turbine, the second compressor, and the second core shaft may be arranged so as to rotate at a higher rotational speed than the first core shaft.

In such an arrangement, the second compressor may be positioned so as to be axially downstream of the first compressor. The second compressor may be arranged so as to receive (for example directly receive, for example via a generally annular duct) flow from the first compressor.

The gearbox may be arranged so as to be driven by the core shaft (for example the first core shaft in the example above) that is configured to rotate (for example during use) at the lowest rotational speed. For example, the gearbox may be arranged so as to be driven only by the core shaft (for example only by the first core shaft, and not the second core shaft, in the example above) that is configured to rotate (for example when in use) at the lowest rotational speed. Alternatively thereto, the gearbox may be arranged so as to be driven by one or a plurality of shafts, for example the first and/or the second shaft in the example above.

In the case of a gas turbine engine as described and/or claimed herein, a combustion chamber may be provided axially downstream of the fan and of the compressor(s). For example, the combustion chamber may lie directly downstream of the second compressor (for example at the exit of the latter), when a second compressor is provided. By way of further example, the flow at the exit of the compressor may be provided to the inlet of the second turbine, when a second turbine is provided. The combustion chamber may be provided so as to be upstream of the turbine(s).

The or each compressor (for example the first compressor and the second compressor as described above) may comprise any number of stages, for example multiple stages. Each stage may comprise a row of rotor blades and a row of stator blades, which may be variable stator blades (in the sense that the angle of incidence of said variable stator blades may be variable). The row of rotor blades and the row of stator blades may be axially offset from each other.

The or each turbine (for example the first turbine and the second turbine as described above) may comprise any number of stages, for example multiple stages. Each stage may comprise a row of rotor blades and a row of stator blades. The row of rotor blades and the row of stator blades may be axially offset from one another.

Each fan blade may be defined as having a radial span extending from a root (or a hub) at a radially inner location flowed over by gas, or at a 0% span width position, to a tip at a 100% span width position. The ratio of the radius of the fan blade at the hub to the radius of the fan blade at the tip may be less than (or on the order of): 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip may be in an inclusive range delimited by two of the values in the previous sentence (that is to say that the values may form upper or lower limits). These ratios may be referred to in general as the hub-to-tip ratio. The radius at the hub and the radius at the tip can both be measured at the leading periphery (or the axially frontmost periphery) of the blade. The hub-to-tip ratio refers, of course, to that portion of the fan blade which is flowed over by gas, that is to say the portion that is situated radially outside any platform.

The radius of the fan can be measured between the engine centerline and the tip of the fan blade at the leading periphery of the latter. The diameter of the fan (which may simply be double the radius of the fan) may be larger than (or on the order of): 250 cm (approximately 100 inches), 260 cm, 270 cm (approximately 105 inches), 280 cm (approximately 110 inches), 290 cm (approximately 115 inches), 300 cm (approximately 120 inches), 310 cm, 320 cm (approximately 125 inches), 330 cm (approximately 130 inches), 340 cm (approximately 135 inches), 350 cm, 360 cm (approximately 140 inches), 370 cm (approximately 145 inches), 380 cm (approximately 150 inches), or 390 cm (approximately 155 inches). The fan diameter may be in an inclusive range delimited by two of the values in the previous sentence (that is to say that the values may form upper or lower limits).

The rotational speed of the fan may vary during use. Generally, the rotational speed is lower for fans with a comparatively large diameter. Purely by way of non-limiting example, the rotational speed of the fan at cruise conditions can be less than 2500 rpm, for example less than 2300 rpm. Purely by way of further non-limiting example, the rotational speed of the fan at cruise conditions for an engine having a fan diameter in the range from 250 cm to 300 cm (for example 250 cm to 280 cm) can also be in the range from 1700 rpm to 2500 rpm, for example in the range from 1800 rpm to 2300 rpm, for example in the range from 1900 rpm to 2100 rpm. Purely by way of further non-limiting example, the rotational speed of the fan at cruise conditions for an engine having a fan diameter in the range from 320 cm to 380 cm can be in the range from 1200 rpm to 2000 rpm, for example in the range from 1300 rpm to 1800 rpm, for example in the range from 1400 rpm to 1600 rpm.

During use of the gas turbine engine, the fan (with associated fan blades) rotates about an axis of rotation. This rotation results in the tip of the fan blade moving with a speed $U_{tip}$. The work done by the fan blades on the flow results in an enthalpy rise dH in the flow. A fan tip loading can be defined as $dH/U_{tip}^2$, where dH is the enthalpy rise (for example the 1-D average enthalpy rise) across the fan and $U_{tip}$ is the (translational) speed of the fan tip, for example at the leading periphery of the tip (which can be defined as the fan tip radius at the leading periphery multiplied by the angular speed). The fan tip loading at cruise conditions may be more than (or on the order of): 0.3, 0.31, 0.32, 0.33, 0.34, 0.35, 0.36, 0.37, 0.38, 0.39, or 0.4 (wherein all units in this passage are $Jkg^{-1}K^{-1}/(ms^{-1})^2$), The fan tip loading may be in an inclusive range delimited by two of the values in the previous sentence (that is to say that the values may form upper or lower limits).

Gas turbine engines in accordance with the present disclosure may have any desired bypass ratio, wherein the bypass ratio is defined as the ratio of the mass flow rate of the flow through the bypass duct to the mass flow rate of the flow through the core under cruise conditions. In the case of some arrangements, the bypass ratio may be more than (or on the order of): 10, 10.5, 11, 11.5, 12, 12.5, 13, 13.5, 14, 14.5, 15, 15.5, 16, 16.5, or 17. The bypass ratio may be in an inclusive range delimited by two of the values in the previous sentence (that is to say that the values may form upper or lower limits). The bypass duct may be substantially annular. The bypass duct may be situated radially outside the engine core. The radially outer surface of the bypass duct may be defined by an engine nacelle and/or a fan casing.

The overall pressure ratio of a gas turbine engine as described and/or claimed herein can be defined as the ratio of the stagnation pressure upstream of the fan to the stagnation pressure at the exit of the highest pressure compressor (before entry into the combustion chamber). By way of non-limiting example, the overall pressure ratio of a gas turbine engine as described and/or claimed herein at cruising speed may be greater than (or on the order of): 35, 40, 45, 50, 55, 60, 65, 70, 75. The overall pressure ratio may be in an inclusive range delimited by two of the values in the previous sentence (that is to say that the values can form upper or lower limits).

The specific thrust of an engine can be defined as the net thrust of the engine divided by the total mass flow through the engine. The specific thrust of an engine as described and/or claimed herein at cruise conditions may be less than (or on the order of): 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range delimited by two of the values in the previous sentence (that is to say that the values may form upper or lower limits). Such engines can be particularly efficient in comparison with conventional gas turbine engines.

A gas turbine engine as described and/or claimed herein may have any desired maximum thrust. Purely by way of non-limiting example, a gas turbine as described and/or claimed herein can be capable of generating a maximum thrust of at least (or on the order of): 160 kN, 170 kN, 180 kN, 190 kN, 200 kN, 250 kN, 300 kN, 350 kN, 400 kN, 450 kN, 500 kN, or 550 kN. The maximum thrust may be in an inclusive range delimited by two of the values in the previous sentence (that is to say that the values may form upper or lower limits). The thrust referred to above may be the maximum net thrust at standard atmospheric conditions at sea level plus 15 degrees C. (ambient pressure 101.3 kPa, temperature 30 degrees C.) in the case of a static engine.

In use, the temperature of the flow at the entry to the high-pressure turbine can be particularly high. This temperature, which can be referred to as TET, may be measured at the exit to the combustion chamber, for example directly upstream of the first turbine blade, which in turn can be referred to as a nozzle guide blade. At cruising speed, the TET may be at least (or on the order of): 1400K, 1450K, 1500K, 1550K, 1600K, or 1650K. The TET at cruising speed may be in an inclusive range delimited by two of the values in the previous sentence (that is to say that the values can form upper or lower limits). The maximum TET in the use of the engine can be at least (or on the order of), for example: 1700K, 1750K, 1800K, 1850K, 1900K, 1950K, or 2000K. The maximum TET may be in an inclusive range delimited by two of the values in the previous sentence (that is to say that the values may form upper or lower limits). The maximum TET may occur, for example, under a high thrust condition, for example under a maximum take-off thrust (MTO) condition.

A fan blade and/or an airfoil portion of a fan blade described and/or claimed herein may be manufactured from any suitable material or a combination of materials. For example, at least a part of the fan blade and/or of the airfoil may be manufactured at least in part from a composite, for example a metal matrix composite and/or an organic matrix composite, such as carbon fibre. By way of a further example, at least a part of the fan blade and/or of the airfoil may be manufactured at least in part from a metal, such as a titanium-based metal or an aluminium-based material (such as an aluminium-lithium alloy) or a steel-based material. The fan blade may comprise at least two regions which are manufactured using different materials. For example, the fan blade may have a protective leading periphery, which is manufactured using a material that is better able to resist impact (for example of birds, ice, or other material) than the rest of the blade. Such a leading periphery may, for example, be manufactured using titanium or a titanium-based alloy. Thus, purely by way of example, the fan blade may have a carbon-fibre-based or aluminium-based body (such as an aluminium-lithium alloy) with a titanium leading periphery.

A fan as described and/or claimed herein may comprise a central portion, from which the fan blades may extend, for example in a radial direction. The fan blades may be attached to the central portion in any desired manner. For example, each fan blade may comprise a fixing device which can engage with a corresponding slot in the hub (or disk). Purely by way of example, such a fixing device may be in the form of a dovetail that can be inserted into and/or engage with a corresponding slot in the hub/disk in order for the fan blade to be fixed to the hub/disk. By way of a further example, the fan blades may be formed integrally with a central portion. Such an arrangement may be referred to as a blisk or a bling. Any suitable method may be used to manufacture such a blisk or such a bling. For example, at least a part of the fan blades may be machined from a block and/or at least a part of the fan blades may be attached to the hub/disk by welding, such as linear friction welding.

The gas turbine engines described and/or claimed herein may or may not be provided with a variable area nozzle (VAN). Such a variable area nozzle can allow the exit cross section of the bypass duct to be varied during use. The general principles of the present disclosure can apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions during the middle part of the flight, for example the conditions experienced by the aircraft and/or the engine between (in terms of time and/or distance) the end of the ascent and the start of the descent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example in the region of Mach 0.8, in the region of Mach 0.85 or in the range of from 0.8 to 0.85. Any arbitrary speed within these ranges can be the constant cruise condition. In the case of some aircraft, the constant cruise conditions may be outside these ranges, for example below Mach 0.7 or above Mach 0.9.

Purely by way of example, the cruise conditions may correspond to standard atmospheric conditions at an altitude that is in the range from 10,000 m to 15,000 m, for example in the range from 10,000 m to 12,000 m, for example in the range from 10,400 m to 11,600 m (around 38,000 ft), for example in the range from 10,500 m to 11,500 m, for example in the range from 10,600 m to 11,400 m, for example in the range from 10,700 m (around 35,000 ft) to 11,300 m, for example in the range from 10,800 m to 11,200 m, for example in the range from 10,900 m to 11,100 m, for example in the region of 11,000 m. The cruise conditions may correspond to standard atmospheric conditions at any given altitude in these ranges.

Purely by way of example, the cruise conditions may correspond to the following: a forward Mach number of 0.8; a pressure of 23,000 Pa; and a temperature of −55 degrees C.

As used anywhere herein, "cruising speed" or "cruise conditions" may mean the aerodynamic design point. Such an aerodynamic design point (or ADP) may correspond to the conditions (including, for example, the Mach number, environmental conditions, and thrust requirement) for which the fan operation is designed. This may mean, for example, the conditions under which the fan (or the gas turbine engine) has the optimum efficiency in terms of construction.

During use, a gas turbine engine described and/or claimed herein may operate at the cruise conditions defined elsewhere herein. Such cruise conditions may be determined by the cruise conditions (for example the conditions during the middle part of the flight) of an aircraft to which at least one (for example 2 or 4) gas turbine engine(s) can be fastened in order to provide the thrust force.

It is self-evident to a person skilled in the art that a feature or parameter described in relation to any one of the above aspects may be applied to any other aspect, unless they are mutually exclusive. Furthermore, any feature or any parameter described here may be applied to any aspect and/or combined with any other feature or parameter described here, unless they are mutually exclusive.

The invention will be explained in more detail below on the basis of a plurality of exemplary embodiments with reference to the figures of the drawing. In the drawing.

Figure 1:
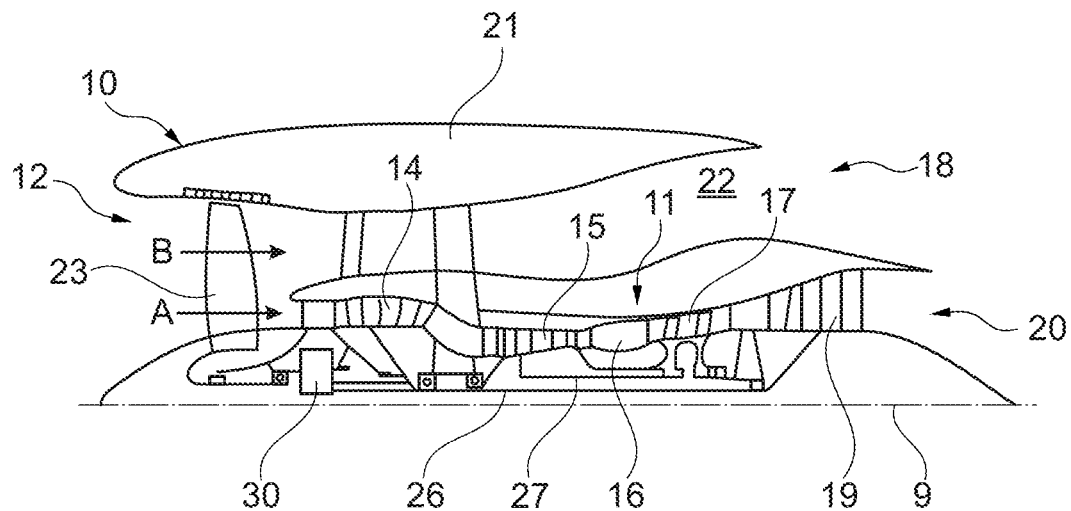
FIG. 1 shows a sectional lateral view of a gas turbine engine.

FIG. 1 illustrates a gas turbine engine 10 having a main axis of rotation 9. The engine 10 comprises an air intake 12 and a thrust fan 23 that generates two air flows: a core air flow A and a bypass air flow B. The gas turbine engine 10 comprises a core 11 which receives the core air flow A. In the sequence of axial flow, the engine core 11 comprises a low-pressure compressor 14, a high-pressure compressor 15, a combustion installation 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is attached to and driven by the low-pressure turbine 19 by way of a shaft 26 and an epicyclic gearbox 30.

During use, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resultant hot combustion products then expand through, and thereby drive, the high-pressure and low-pressure turbines 17, 19 before being expelled through the nozzle 20 to provide some thrust force. The high-pressure turbine 17 drives the high-pressure compressor 15 by means of a suitable connecting shaft 27. The fan 23 generally provides the major part of the thrust force. The epicyclic gearbox 30 is a reduction gearbox.

Figure 2:
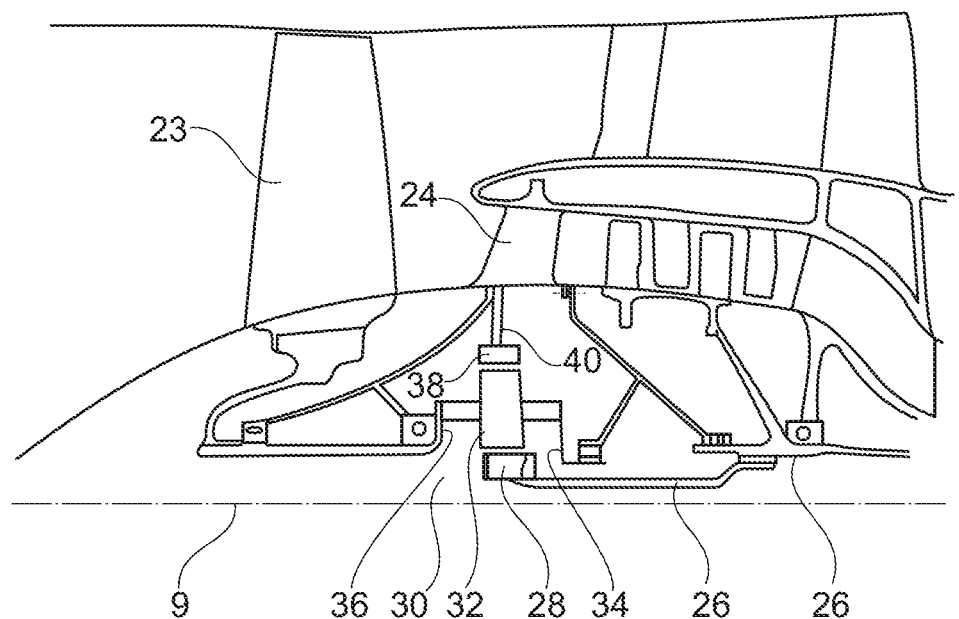
FIG. 2 shows a close-up sectional lateral view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun gear 28 of the epicyclic gearbox assembly 30. Radially to the outside of the sun gear 28 and meshing therewith is a plurality of planet gears 32 that are coupled to one another by a planet carrier 34. The planet carrier 34 limits the planet gears 32 to orbiting around the sun gear 28 in a synchronous manner while enabling each planet gear 32 to rotate about its own axis. The planet carrier 34 is coupled by way of linkages 36 to the fan 23 so as to drive the rotation of the latter about the engine axis 9. Radially to the outside of the planet gears 32 and meshing therewith is an annulus or ring gear 38 that is coupled, via linkages 40, to a stationary supporting structure 24.

It is noted that the terms "low-pressure turbine" and "low-pressure compressor" as used herein can be taken to mean the lowest-pressure turbine stage and the lowest-pressure compressor stage (that is to say not including the fan 23) respectively and/or the turbine and compressor stages that are connected to one another by the connecting shaft 26 with the lowest rotational speed in the engine (that is to say not including the gearbox output shaft that drives the fan 23). In some literature, the "low-pressure turbine" and "low-pressure compressor" referred to herein may alternatively be known as the "intermediate-pressure turbine" and "intermediate-pressure compressor". Where such alternative nomenclature is used, the fan 23 can be referred to as a first compression stage or lowest-pressure compression stage.

Figure 3:
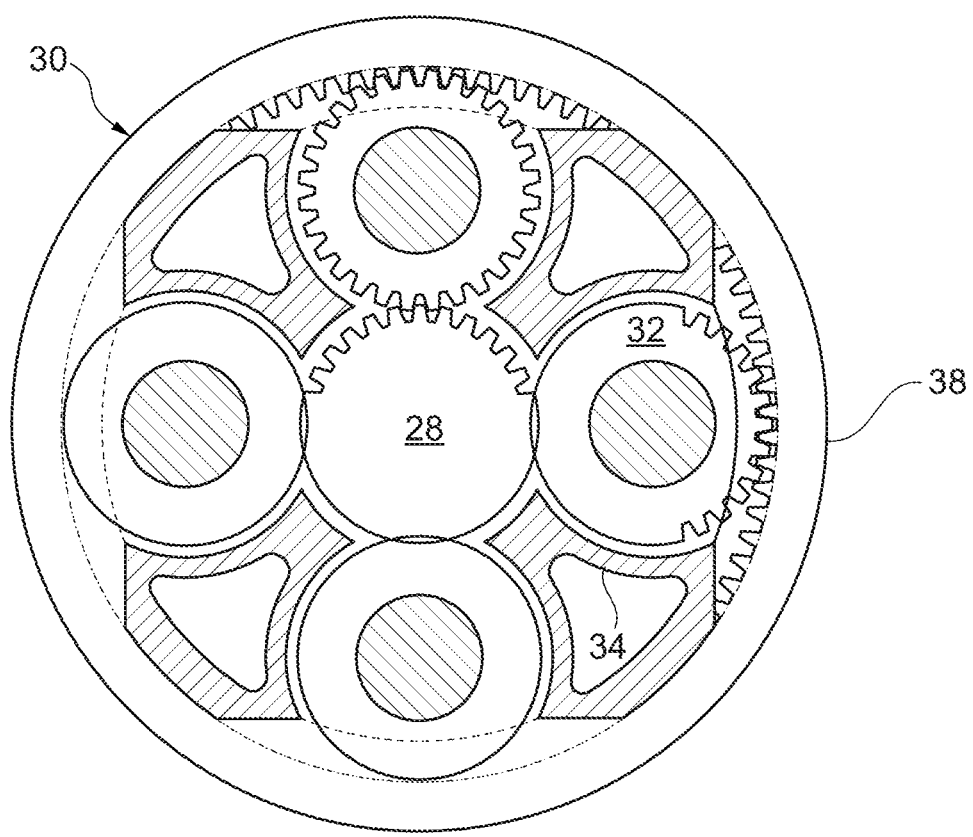
FIG. 3 shows a partially cut-away view of a gearbox for a gas turbine engine.

The epicyclic gearbox 30 is shown in an exemplary manner in greater detail in FIG. 3. Each of the sun gear 28, the planet gears 32 and the ring gear 38 comprise teeth about their periphery to mesh with the other gears. However, for clarity, only exemplary portions of the teeth are illustrated in FIG. 3. There are four planet gears 32 illustrated, although it will be apparent to the person skilled in the art that more or fewer planet gears 32 can be provided within the scope of protection of the claimed invention. Practical applications of an epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, wherein the ring gear 38 is fixed. However, any other suitable type of epicyclic gearbox 30 may be used. By way of a further example, the epicyclic gearbox 30 may be a star arrangement, in which the planet carrier 34 is held so as to be fixed, wherein the ring gear (or annulus) 38 is allowed to rotate. In the case of such an arrangement, the fan 23 is driven by the ring gear 38. By way of a further alternative example, the gearbox 30 can be a differential gearbox in which the ring gear 38 and the planet carrier 34 are both allowed to rotate.

It is self-evident that the arrangement shown in FIGS. 2 and 3 is merely an example, and various alternatives fall within the scope of protection of the present disclosure. Purely by way of example, any suitable arrangement may be used for positioning the gearbox 30 in the engine 10 and/or for connecting the gearbox 30 to the engine 10. By way of a further example, the connections (such as the linkages 36, 40 in the example of FIG. 2) between the gearbox 30 and other parts of the engine 10 (such as the input shaft 26, the output shaft and the fixed structure 24) may have a certain degree of stiffness or flexibility. By way of a further example, any suitable arrangement of the bearings between rotating and stationary parts of the engine (for example between the input and output shafts of the gearbox and the fixed structures, such as the gearbox casing) may be used, and the disclosure is not limited to the exemplary arrangement of FIG. 2. For example, where the gearbox 30 has a star arrangement (described above), the person skilled in the art would readily understand that the arrangement of output and support linkages and bearing positions would typically be different to that shown by way of example in FIG. 2.

Accordingly, the present disclosure extends to a gas turbine engine having an arbitrary arrangement of gearbox types (for example star-shaped or planetary), support structures, input and output shaft arrangement, and bearing positions.

Optionally, the gearbox may drive additional and/or alternative components (e.g. the intermediate-pressure compressor and/or a booster compressor).

Other gas turbine engines to which the present disclosure can be applied may have alternative configurations. For example, engines of this type may have an alternative number of compressors and/or turbines and/or an alternative number of connecting shafts. By way of a further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed-flow nozzle. One or both nozzles (whether mixed or split flow) may have a fixed or variable area. While the example described relates to a turbofan engine, the disclosure may be applied, for example, to any type of gas turbine engine, such as an open-rotor engine (in which the fan stage is not surrounded by an engine nacelle) or a turboprop engine. In some arrangements, the gas turbine engine 10 may not comprise a gearbox 30.

The geometry of the gas turbine engine 10, and components thereof, is/are defined by a conventional axis system, comprising an axial direction (which is aligned with the axis 9 of rotation), a radial direction (in the bottom-to-top direction in FIG. 1), and a circumferential direction (perpendicular to the view in FIG. 1). The axial, radial and circumferential directions run so as to be mutually perpendicular.

Figure 4:
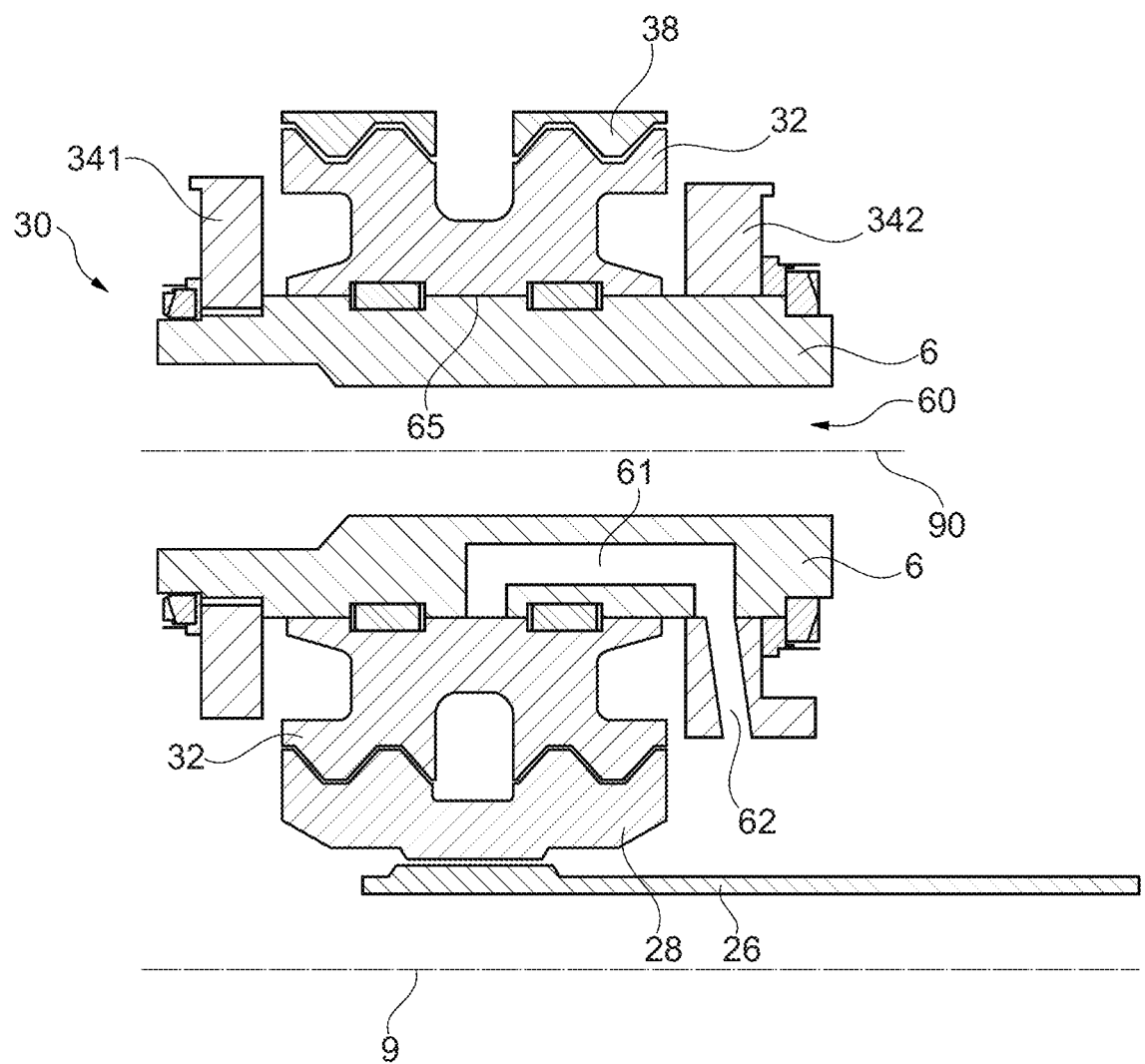
FIG. 4 shows a sectional illustration of the elements of a planetary gearbox which is suitable for use in a gas turbine engine as shown in FIG. 1.

FIG. 4 shows a sectional illustration of another exemplary embodiment of a planetary gearbox of a gas turbine engine 10 designed as a geared fan engine as shown in FIG. 1. The planetary gearbox 30 comprises a sun gear 28, which is driven by a drive shaft or sun shaft 26. The drive shaft 26 is the shaft 26 in FIGS. 1 and 2 or, more generally, a turbine shaft. In this arrangement, the sun gear 28 and the drive shaft 26 rotate around the axis of rotation 9. The axis of rotation of the planetary gearbox 30 is identical with the axis of rotation 9 or engine axis of the gas turbine engine 10.

The planetary transmission 30 furthermore comprises a plurality of planet gears 32, one of which is illustrated in the sectional illustration in FIG. 4. The sun gear 28 drives the plurality of planet gears 32, wherein a tooth system of the sun gear 28 is in engagement with a tooth system of the planet gear 32.

The planet gear 32 is of hollow-cylindrical design and forms an outer circumferential surface and an inner circumferential surface. Driven by the sun gear 28, the planet gear 32 rotates around an axis of rotation 90, which is parallel to the axis of rotation 9. The outer circumferential surface of the planet gear 32 forms a tooth system, which is in engagement with the tooth system of a ring gear 38. The ring gear 38 is arranged in a fixed manner, i.e. in such a way that it does not rotate. Owing to their coupling with the sun gear 28, the planet gears 32 rotate and, at the same time, move along the circumference of the ring gear 38. The rotation of the planet gears 32 along the circumference of the ring gear 38 and simultaneously around the axis of rotation 90 is slower than the rotation of the drive shaft 26, thereby providing a reduction ratio.

Adjoining its inner circumferential surface, the planet gear 32 has a centred axial opening. A planet pin 6 is inserted into the opening, said pin itself having an axial hole 60, wherein the planet pin 6 and the planet gear 32 forming, that the mutually facing surfaces thereof, a bearing 65, e.g. a rolling bearing or a plain bearing.

FIG. 4 furthermore shows a front carrier plate 81 and a rear carrier plate and 82, which form of a planet carrier (cf. FIG. 2). The planet pin 6 is fixed to the front carrier plate 81 and to the rear carrier plate 82, being screwed or welded thereto. For example, the front carrier plate 81 is connected to a torque transmitting member, which is connected to the fan shaft.

For lubrication of the bearing 65 between the planet pin 6 and the planet gear 32, an oil feed device is provided, comprising an oil feed passage 62, via which oil from a circulating oil system is directed into lubricating film openings 61 in the planet pin 6.

Figure 5:
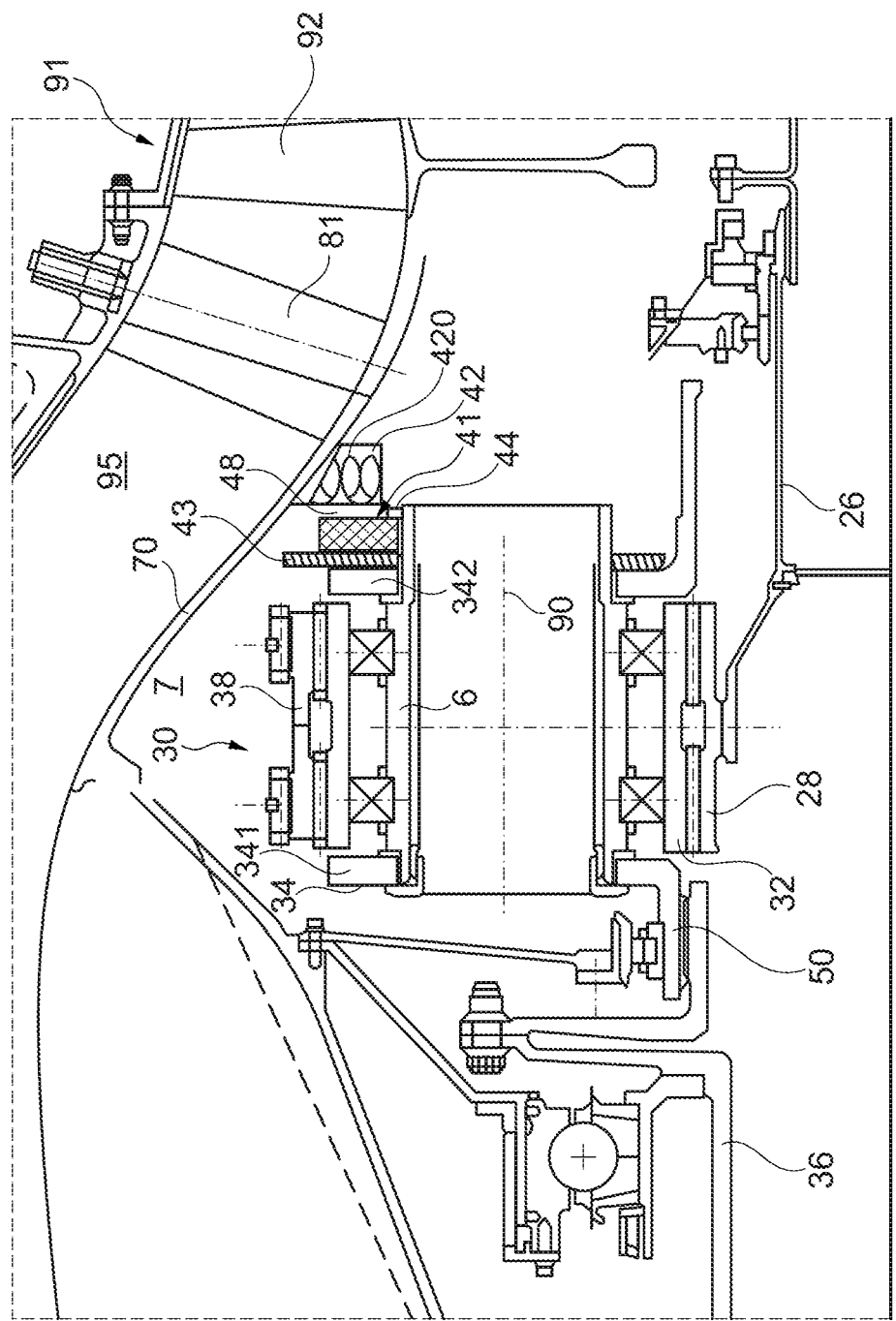
FIG. 5 shows a sectional illustration of a front subassembly of a gas turbine engine which comprises a planetary gearbox as shown in FIG. 4, integrated into which is an electric generator having a rotor and a stator that are spaced apart axially.

FIG. 5 shows a first exemplary embodiment of a planetary gearbox into which an electric generator is integrated. Fundamentally, the design of the planetary gearbox 30 is as described with reference to FIG. 4. Accordingly, it comprises a sun gear 28, which is driven by a sun shaft 26. The sun shaft 26 is formed by an axially forward section of a low-pressure turbine shaft. The planetary gearbox 30 furthermore comprises planet carrier 36, a ring gear 38, planet pins 6 and a planet carrier 34, which comprises an axially forward carrier plate 341 and an axially rearward carrier plate 342. The axially forward carrier plate 341 is connected to a torque transmitting member 50, which is coupled to a fan shaft 36.

It can furthermore be seen in FIG. 5 that the planetary gearbox 30 is arranged in a gearbox space 7, which is delimited radially on the outside by a gearbox casing 70. Here, the arrangement is such that the gearbox casing 70 in the exemplary embodiment illustrated simultaneously forms the radially inner flow path boundary for the primary flow duct 95 that extends through the core engine of the gas turbine engine. A variable inlet stator 81 and a downstream compressor 91 with rotor blades 92 can be seen as components of the core engine. However, the gearbox casing 70 may also be formed by different wall structures which do not simultaneously form the radially inner flow path boundary of the primary flow duct 95.

Figure 7:
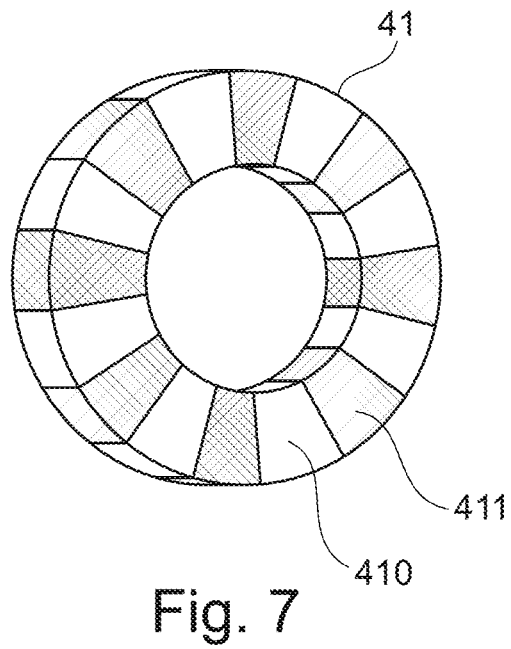
FIG. 7 shows a first exemplary embodiment of a rotor, which is of annular design and has alternating north poles and south poles.

To integrate an electric generator into the sanitary gearbox 30, a rotor 41 is connected to the axially rearward carrier plate 342. The connection is made by means of a fastening ring 44, which connects the rotor 41 to the rearward carrier plate 342. The rotor 41 is of annular design and comprises a plurality of permanent magnets, which are arranged in the circumferential direction. FIG. 7 shows an exemplary embodiment of a rotor 41 of this kind schematically and by way of example. The rotor 41 has alternately N-polarised magnets 410 and S-polarised magnets 411, the field lines of which each also extend in the axial direction.

The rotor 41 interacts with a stator 42, which is arranged on the inside of the gearbox casing 70. Here, the stator comprises induction coils 420, the number of which corresponds to the number of magnets 410, 411 of the rotor 41 or alternatively differs therefrom.

In this case, the arrangement is such that the rotor 41 and the stator 42 are spaced apart axially. The gap 48 formed between the rotor 41 and the stator 42 accordingly extends in the radial direction. Here, the gap 48 selected is as small as possible to ensure that the coupling between the rotor 41 and the stator 43 is as strong as possible. For example, the gap 48 has a width in a range between 1 mm and 5 mm. In all cases, the gap 48 is chosen so that it is larger than any possible axial deflections of the gearbox 30, which may arise, for example, from floating suspension of the planetary gearbox 30.

The permanent magnets of the rotor 41 can be designed in such a way that they have a high magnetic energy density and retain or do not lose much of their magnetic energy density up to a temperature of, for example, 150° C. Samarium-cobalt magnets are used for this purpose, for example. One advantage of a high thermal stability of the magnets is that, in this case, the magnets do not have to be cooled. Thus, the temperature in the gearbox chamber 7 is typically in a range between 110° C. and 130° C. Cooling of the stator 42 can be accomplished by means of the cooling (not illustrated) of the gearbox casing 70 which is provided in any case. Alternatively, provision can be made for the magnets of the rotor 41 to be cooled. It is also conceivable in principle for the magnets of the rotor 41 to be embodied as electromagnets.

A magnetic shielding element 43, which prevents the planet carrier 34 and components connected to the latter from being magnetized, is arranged between the rotor 41 and the axially rearward carrier plate 342. Such magnetization should be avoided to prevent any metal particles from collecting on the components of the planetary gearbox 30, potentially increasing wear. A ceramic plate is used as a magnetic shielding element 43, for example. This can be arranged over the entire axially rearward surface of the axially rearward carrier plate 342.

The arrangement created enables power to be generated in an effective manner. Admittedly, the planet carrier 34 rotates more slowly than the drive shaft 26 owing to the reduction provided by the planetary transmission. However, the rotor 41 is arranged at a relatively large radial distance from the engine axis, and therefore the orbital velocity is high. For example, the orbital velocity when the planet carrier 34 rotates at 1600 rpm and the rotor is formed at a radius of about 0.4 m from the engine is about 68 m/s.

It should be noted that the rotor 41 is not necessarily connected directly to the axially rearward carrier plate 342. It can likewise be connected to the carrier plate 342 via an intermediate component, such as a holding plate.

Figure 6:
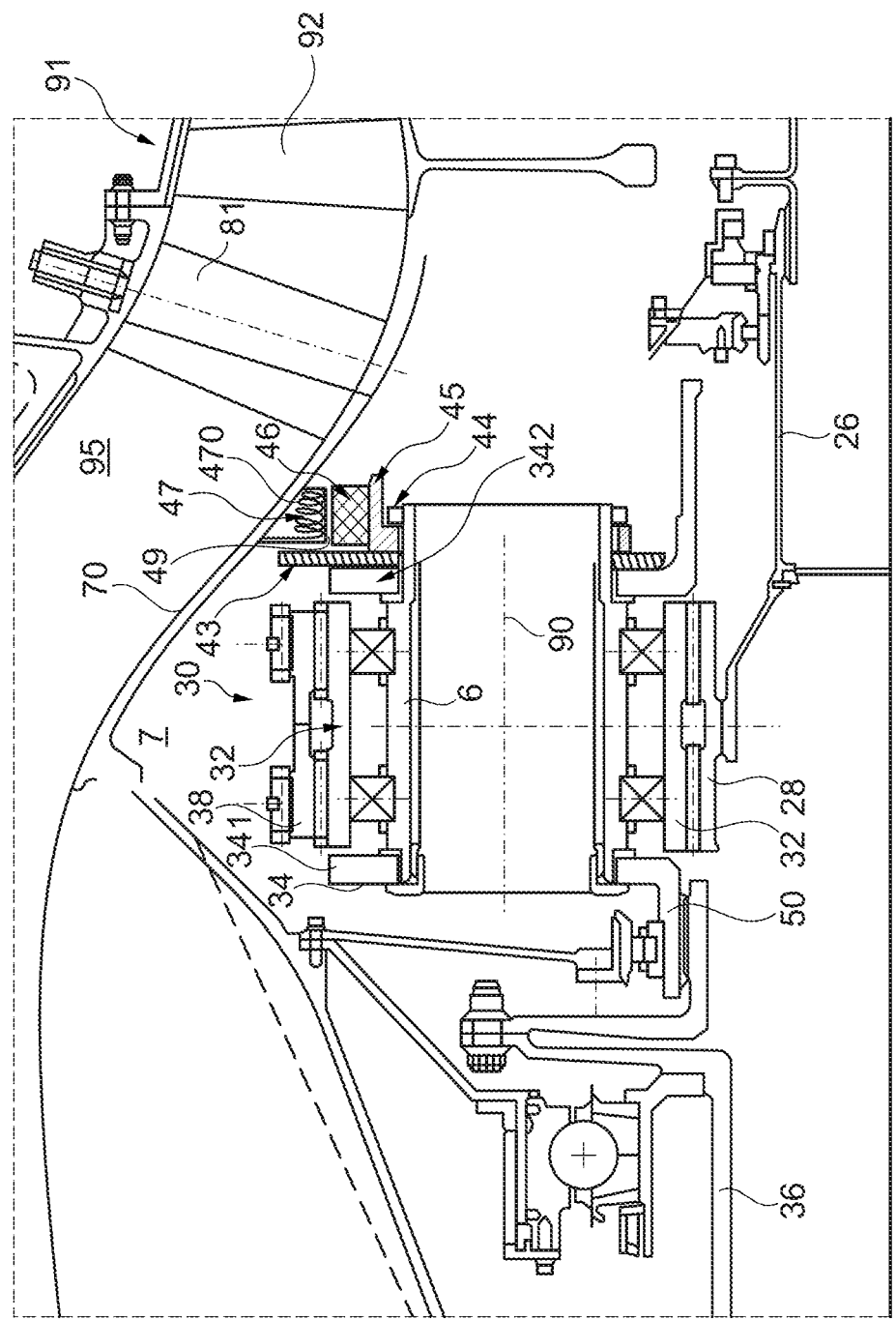
FIG. 6 shows a sectional illustration of a front subassembly of a gas turbine engine which comprises a planetary gearbox as shown in FIG. 4, integrated into which is an electric generator having a rotor and a stator that are spaced apart radially.

FIG. 6 shows another exemplary embodiment of a planetary gearbox 30 containing an integrated electric generator. The main difference with respect to the exemplary embodiment in FIG. 5 is that the rotor and state of the electric generator are spaced apart radially and, accordingly, a gap formed between them extends in the axial direction.

For the construction of the planetary gearbox 30 and the arrangement thereof in the gas turbine engine, attention is drawn to the description of FIG. 5. In this exemplary embodiment too, the rotor 46 is coupled to the axially rearward carrier plate 342. Here, it is envisaged that the rotor 46 is arranged on a holding plate 45, which is connected to the axially rearward carrier plate 342 and is secured by means of a fastening ring 44.

Figure 8:
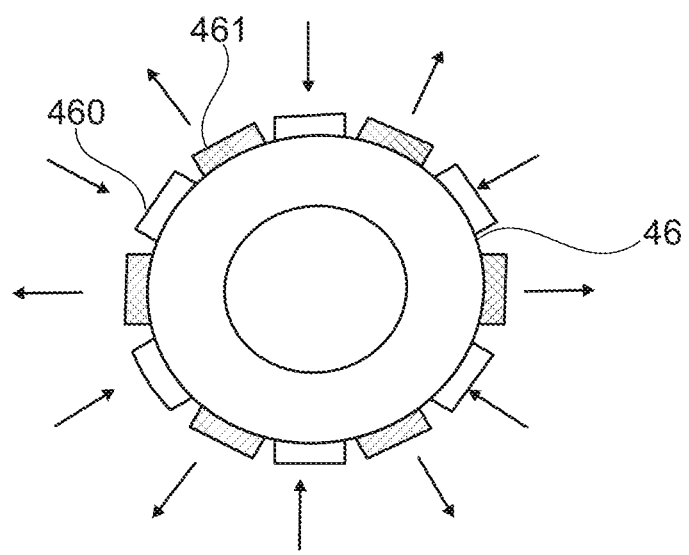
FIG. 8 shows a second exemplary embodiment of a rotor, which is of annular design and has alternating north poles and south poles.

The rotor 46 is of annular design, for example, and comprises a plurality of permanent magnets, which are arranged in the circumferential direction. FIG. 8 shows an exemplary embodiment of a rotor 46 of this kind schematically and by way of example. The rotor 46 has alternating S-polarised magnets 460 and N-polarised magnets 461, which are oriented radially outwards.

The rotor 46 interacts with a stator 47, which, in this exemplary embodiment too, is arranged on the inside of the gearbox casing 70. The stator 47 comprises induction coils 470, the number of which corresponds to the number of magnets 460, 461 of the rotor 46 or alternatively differs therefrom.

In this case, the arrangement is such that the rotor 46 and the stator 47 are spaced apart radially. The gap 49 formed between the rotor 46 and the stator 47 accordingly extends in the axial direction. Here, the gap 49 selected is as small as possible to ensure that the coupling between the rotor 46 and the stator 47 is as strong as possible. For example, the gap has a width in a range between 0.5 mm and 2.5 mm. In all cases, the gap 49 is chosen so that it is larger than any possible radial deflections of the gearbox 30.

The permanent magnets 460, 461 of the rotor 46 can be designed in such a way that they retain or do not lose much of their magnetic energy density up to a temperature of, for example, 150° C. Samarium-cobalt magnets are used for this purpose, for example. Cooling of the stator 47 can be accomplished by means of the cooling of the gearbox casing 70.

In the exemplary embodiment in FIG. 6 too, a magnetic shielding element 43, that prevents the planet carrier 34 and any other components connected to the latter from being magnetized, is arranged between the rotor 46 and the axially rearward carrier plate 342. A ceramic plate is used as a magnetic shielding element 43, for example. This can be arranged over the entire axially rearward surface of the axially rearward carrier plate 342.

It is self-evident that the invention is not limited to the embodiments described above and that various modifications and improvements may be made without departing from the concepts described herein. In particular the described arrangement of the rotor on the planet carrier and of the stator on the planetary gearbox casing should be taken to be purely illustrative. Numerous modifications in this respect may be provided.

It should be noted that, except where mutually exclusive, any of the features described can be employed separately or in combination with any other features, and the disclosure extends to and includes all combinations and sub-combinations of one or more features that are described herein. If ranges are defined, said ranges thus comprise all of the values within said ranges as well as all of the partial ranges that lie in a range.

The invention claimed is:
1. A reduction gearbox, comprising:
an input, configured to be attached to an input shaft, which has an input speed,
an output, which rotates at an output speed that is lower than the input speed,
a statically arranged component,
an electric generator integrated into the reduction gearbox, the electric generator comprising a rotor and a stator, wherein the rotor is attached to the output, and the stator is attached to the statically arranged component to remain static, wherein the reduction gearbox is a planetary gearbox, comprising:
- a sun gear as the input, which rotates around an axis of rotation of the planetary gearbox and is driven by a sun shaft,
- a plurality of planet gears, which are driven by the sun gear,
- a ring gear, which is in engagement with the plurality of planet gears,
- a planet carrier, which couples the planet gears to one another,
- a statically arranged planetary gearbox casing positioned at a radial exterior of the planetary gearbox;

wherein:
- either the planet gears revolve synchronously around the sun gear and the ring gear is arranged in a static manner, in which case the planet carrier or a structure attached to the planet carrier forms the output, to which the rotor is attached to rotate as one with the planet carrier, or
- the planet carrier is of static configuration and the ring gear revolves around the sun gear, in which case the ring gear or a structure attached to the ring gear forms the output, to which the rotor is attached to rotate as one with the ring gear,
- wherein the statically arranged component to which the stator is attached is the ring gear when the ring gear is arranged in a static manner or as a structure attached to the planet carrier when the planet carrier is arranged in a static manner.

2. The reduction gearbox according to claim 1, wherein the output and the rotor, on one hand, and the statically arranged component and the stator, on the other hand, are arranged and positioned relative to one another in such a way that the rotor and the stator are spaced apart axially.

3. The reduction gearbox according to claim 1, wherein the output and the rotor, on one hand, and the statically arranged component and the stator, on the other hand, are arranged and positioned relative to one another in such a way that the rotor and the stator are spaced apart radially, wherein the stator is arranged radially outwardly with respect to the rotor.

4. The reduction gearbox according to claim 1, wherein the rotor includes magnets and the stator includes induction coils.

5. The reduction gearbox according to claim 4, wherein the rotor includes permanent magnets.

6. The reduction gearbox according to claim 1, and further comprising a magnetic shielding element shielding the rotor from an adjoining component of the reduction gearbox.

7. The reduction gearbox according to claim 1, wherein the statically arranged component, to which the stator is attached, is formed by a statically arranged wall structure positioned radially outwardly of an exterior of the reduction gearbox.

8. The reduction gearbox according to claim 1, wherein the statically arranged component, to which the stator is attached, is formed by a statically arranged gearbox element of the reduction gearbox.

9. The reduction gearbox according to claim 1, wherein the statically arranged component to which the stator is attached includes the planetary gearbox casing.

10. The reduction gearbox according to claim 1, and further comprising:
- wherein the planet gears are arranged in an orbiting manner and the ring gear is arranged in a static manner, wherein the planet carrier or a structure attached to the planet carrier forms the output,
- a plurality of planet pins, wherein each planet pin is arranged in respective one of the planet gears,
- wherein the planet carrier has an axially forward carrier plate and an axially rearward carrier plate, wherein the planet pins are arranged in openings in the axially forward carrier plate and in the axially rearward carrier plate and are connected to the axially forward and rearward carrier plates,
- wherein the rotor is attached to the axially rearward carrier plate to rotate one to one with the planet carrier.

11. The reduction gearbox according to claim 10, wherein the stator is fixed on the planetary gearbox casing in a manner spaced apart axially from the rotor.

12. The reduction gearbox according to claim 10, wherein the stator is fixed on the planetary gearbox casing in a manner spaced apart radially from the rotor.

13. The reduction gearbox according to claim 10, and further comprising a holding plate, wherein the rotor is fixed on the holding plate, which is connected to the axially rearward carrier plate.

14. The reduction gearbox according to claim 10, and further comprising a magnetic shielding element shielding the rotor from an adjoining component of the reduction gearbox, wherein the magnetic shielding element is arranged between the axially rearward carrier plate and the rotor.

15. The reduction gearbox according to claim 14, wherein the magnetic shielding element is a ceramic plate.

16. The reduction gearbox according to claim 10, wherein the rotor has n magnets, where n≥2, the n magnets being arranged at equidistant intervals along a circumference of the axially rearward carrier plate.

17. A gas turbine engine for an aircraft, comprising:
- an engine core which comprises a turbine, a compressor and a core shaft connecting the turbine to the compressor and formed as a hollow shaft;
- a fan, which is positioned upstream of the engine core, wherein the fan comprises a plurality of fan blades and is driven by a fan shaft; and
- the reduction gearbox according to claim 1, with the input being connected to the turbine shaft and the output being connected to the fan shaft.

18. The gas turbine engine according to claim 17, wherein the rotor includes permanent magnets having magnetic properties which are present up to a temperature of at least 150° C.

19. A reduction gearbox, comprising:
- an input, configured to be attached to an input shaft, which has an input speed,
- an output, which rotates at an output speed that is lower than the input speed,
- a statically arranged component,
- an electric generator integrated into the reduction gearbox, the electric generator comprising a rotor and a stator, wherein the rotor is attached to the output, and the stator is attached to the statically arranged component to remain static,
- wherein the reduction gearbox is a planetary gearbox, comprising:
  - a sun gear as the input, which rotates around an axis of rotation of the planetary gearbox and is driven by a sun shaft,
  - a plurality of planet gears, which are driven by the sun gear, a ring gear, which is in engagement with the plurality of planet gears, a planet carrier, which couples the planet gears to one another, a statically arranged planetary gearbox casing positioned at a radial exterior of the planetary gearbox;

wherein the planet gears are arranged in an orbiting manner and the ring gear is arranged in a static manner, wherein the planet carrier or a structure attached to the planet carrier forms the output to which the rotor is attached, a plurality of planet pins, wherein each planet pin is arranged in respective one of the planet gears, the planet carrier has an axially forward carrier plate and an axially rearward carrier plate, wherein the planet pins are arranged in openings in the axially forward carrier plate and in the axially rearward carrier plate and are connected to the axially forward and rearward carrier plates, the rotor is attached to the axially rearward carrier plate to rotate as one with the planet carrier.

\* \* \* \* \*